US007768577B2

(12) United States Patent
Shin

(10) Patent No.: US 7,768,577 B2
(45) Date of Patent: Aug. 3, 2010

(54) GAMMA CORRECTION DEVICE, GAMMA CORRECTION METHOD THEREOF, AND LIQUID CRYSTAL DISPLAY DEVICE USING THE SAME

(75) Inventor: Jung Wook Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1251 days.

(21) Appl. No.: 11/318,644

(22) Filed: Dec. 28, 2005

(65) Prior Publication Data

US 2007/0001977 A1 Jan. 4, 2007

(30) Foreign Application Priority Data

Jun. 30, 2005 (KR) ..................... 10-2005-0057593

(51) Int. Cl.
*H04N 5/69* (2006.01)
*G09G 5/10* (2006.01)

(52) U.S. Cl. ...................................... 348/674; 345/690

(58) Field of Classification Search ....................... None
See application file for complete search history.

(56) References Cited

U.S. PATENT DOCUMENTS 5,473,373 A * 12/1995 Hwung et al. ............... 348/254
5,534,948 A * 7/1996 Baldwin ..................... 348/675
5,585,846 A * 12/1996 Kim ........................... 348/254
5,933,199 A * 8/1999 Yoon .......................... 348/674
5,982,427 A * 11/1999 Hunt et al. .................. 348/254
6,160,532 A * 12/2000 Kaburagi et al. .............. 345/87
6,977,647 B2 * 12/2005 Park ........................... 345/204
7,317,460 B2 * 1/2008 Kim et al. ................... 345/690
7,352,351 B2 * 4/2008 Jang et al. ..................... 345/99
2006/0061292 A1 * 3/2006 Koh et al. ................ 315/169.3
2006/0077160 A1 * 4/2006 Park ............................ 345/88
2007/0001963 A1 * 1/2007 Koma .......................... 345/96
2008/0278430 A1 * 11/2008 Kim et al. ..................... 345/99

* cited by examiner

*Primary Examiner*—Paulos M Natnael
(74) *Attorney, Agent, or Firm*—Morgan Lewis & Bockius LLP

(57) ABSTRACT

A gamma correction device for use in a display device includes a gamma voltage controller to generate a digital gamma signal in a unit of a predetermined interval, and a gamma voltage generator to generate an analog gamma voltage corresponding to the digital gamma signal.

12 Claims, 6 Drawing Sheets

Fig.6

| Control | | Channel address | | | | Data | | | | | | | | | | condition |
|---|---|---|---|---|---|---|---|---|---|---|---|---|---|---|---|---|
| C1 | C0 | A3 | A2 | A1 | A0 | D9 | D8 | D7 | D6 | D5 | D4 | D3 | D2 | D1 | D0 | |
| 0 | 0 | X | 0 | 0 | 0 | 0 | 0 | 0 | 0 | 0 | 0 | 0 | 0 | 0 | 0 | Channel:A, Value=0 |
| 0 | 0 | X | 0 | 0 | 1 | 1 | 1 | 1 | 1 | 1 | 1 | 1 | 1 | 1 | 1 | Channel:B, Value=1023 |
| 0 | 0 | X | 0 | 1 | 1 | 1 | 0 | 0 | 0 | 0 | 0 | 0 | 0 | 0 | 1 | Channel:C, Value=513 |
| 0 | 0 | X | 1 | 1 | 1 | 0 | 0 | 0 | 0 | 0 | 1 | 1 | 1 | 1 | 1 | Channel:D, Value=31 |

GAMMA CORRECTION DEVICE, GAMMA CORRECTION METHOD THEREOF, AND LIQUID CRYSTAL DISPLAY DEVICE USING THE SAME

This application claims the benefit of the Korean Patent Application No. 2005-057593 filed on Jun. 30, 2005, which is hereby incorporated by reference.

BACKGROUND OF THE INVENTION

1. Field of the Invention

The present invention relates to a gamma correction, and more particularly, to a gamma correction device capable of controlling a gamma voltage easily and accurately, a gamma correction method thereof, and a liquid crystal display device using the same.

2. Discussion of the Related Art

With rapid advancement towards an information-oriented society, demands for flat panel displays having excellent characteristics such as slim profile, lightweight, and low power consumption have been on the increase. Examples of flat panel display devices includes plasma display panels (PDPs), organic light-emitting devices (OLEDs), and liquid crystal display devices (LCDs). Because LCDs have excellent resolution, color-display characteristics, and image quality, LCDs are actively used in notebook computers, monitors for desktop computers, televisions, and the like.

In general, LCDs have a liquid crystal material formed between two substrates with respective electrodes. The orientation of the liquid crystals is changed due to an electric field generated according to a voltage applied to the two electrodes. Thus, an image can be displayed by controlling transmittance of light according to the changed liquid crystal orientation.

FIG. 1 is a schematic view of a related art LCD. As illustrated in FIG. 1, the related art LCD includes a plurality of gate lines GL0 to GLn, a plurality of data lines DL1 to DLm, a liquid crystal panel 2, a gate driver 4, a data driver 6, a gamma voltage generator 8, and a timing controller 10. The liquid crystal panel 2 includes thin film transistors TFTs and pixel electrodes formed at intersections of the gate lines and the data lines, and displays a predetermined image. The gate driver 4 supplies a scan signal to the gate lines GL1 to GLn of the liquid crystal panel 2. The data driver 6 supplies a predetermined data signal to the data lines DL1 to DLm of the liquid crystal panel 2. The gamma voltage generator 8 supplies a plurality of gamma voltages to the data driver 6. The timing controller 10 generates control signals for controlling the gate driver 4 and the data driver 6.

The liquid crystal panel 2 is formed with liquid crystal material injected between a first glass substrate and a second glass substrate. The plurality of gate lines GL0 to GLn and the plurality of data lines DL0 to DLm are formed on the first glass substrate intersecting each other. The TFTs are formed at the intersections of the gate lines and the data lines to drive the pixel electrodes.

The timing controller 10 supplies red (R), green (G), and blue (B) data signals from the display system (not shown) to the data driver 6. Additionally, the timing controller 10 generates a gate control signal and a data control signal for controlling the gate driver 4 and the data driver 6 using a horizontal sync signal (Hsync) and a vertical sync signal (Vsync) supplied from the display system. The gate control signal is applied to the gate driver 4, and the data control signal is applied to the data driver 6.

The gate driver 4 generates scan pulses sequentially in response to a gate control signal supplied from the timing controller 10, and supplies the scan pulses sequentially to the gate lines GL1 to GLn of the liquid crystal panel 2. The data driver 6 receives R, G, B data and a predetermined control signal from the timing controller 10. The data driver 6 supplies an analog data signal to the data lines DL1 to DLm of the liquid crystal panel 2 in response to the data control signal supplied from the timing controller 10.

More specifically, the data driver 6 receives digital data signals related to an image and outputs analog data signals to drive the pixel electrodes to display the image. To achieve such a result, the gamma voltage generator 8 generates a gamma voltage, which is a reference voltage needed to generate the analog data signal from the data driver 6. Accordingly, the data driver 6 generates an analog data signal using a gamma voltage generated from the gamma voltage generator 8 in response to the digital data signal.

The gamma voltage generator 8 is generally prepared separately from the data driver 6. That is, the gamma voltage generator 8 and the timing controller 10 are generally seated together on a data printed circuit board (PCB). As illustrated in FIG. 2, each of the gamma voltages GMA1 to GMA6 generated from the gamma voltage generator 8 is obtained from terminal points between a plurality of series resistances. The plurality of series resistances are disposed between a power voltage Vdd and ground. That is, the gamma voltages GMA1 to GMA6 are generated through a voltage distribution between the resistances by connecting a plurality of resistances R1 to R6 in series.

Each of the gamma voltages GMA1 to GMA6 is supplied to the data driver 6 and is used as a reference voltage for generating the analog data signal. That is, each of the gamma voltages GMA1 to GMA6 is supplied to a resistance-string part (not shown) of the data driver 6 and is derived into a preferred gray scale level (e.g. 256 gray-scale levels) by the resistance-string part. Accordingly, the data driver 6 outputs the analog data signal by selecting a gray-scale level corresponding to the digital data signal.

The gamma voltages GMA1 to GMA6 generated from the related art gamma voltage generator 8 can be controlled by users of the LCD. In particular, when the gamma voltage is adjusted for a product test, it is difficult for the user to adjust the gamma correction. Therefore, a simple technique is needed to adjust the gamma correction easily and accurately.

Additionally, the gamma voltage can be controlled by the related art gamma voltage generator 8 using an analog gamma correction. Accordingly, it is very difficult to achieve an accurate gray curve using the analog gamma correction.

SUMMARY OF THE INVENTION

Accordingly, the present invention is directed to a gamma correction device, a gamma correction method thereof, and an LCD using the same that substantially obviate one or more problems due to limitations and disadvantages of the related art.

An object of the present invention is to provide a gamma correction device, a gamma correction method, and a liquid crystal display device using the same that allow the gamma voltage to be controlled easily and accurately.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a gamma correction device for use in a display device includes a gamma voltage controller to generate a digital gamma signal in a unit of a predetermined interval, and a gamma voltage generator to generate an analog gamma voltage corresponding to the digital gamma signal.

In another aspect, a liquid crystal display device (LCD) includes a timing controller including a gamma voltage controller to generate a digital gamma signal in a unit of a predetermined interval, a digital-to-analog converter to generate an analog gamma voltage corresponding to the digital gamma signal, and a liquid crystal panel to display an image according to the analog gamma voltage.

In yet another aspect, a liquid crystal display device (LCD) includes a timing controller including a gamma voltage controller to generate a digital gamma signal in a unit of a predetermined interval and a digital-to-analog converter to generate an analog gamma voltage corresponding to the digital gamma signal, and a liquid crystal panel for displaying an image according to the analog gamma voltage.

In still yet another aspect, a gamma correction method includes generating a digital gamma signal in a unit of a predetermined interval, and generating an analog gamma voltage corresponding to the digital gamma signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6 is a table illustrating digital gamma signals output from a data output unit of FIG. 4.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
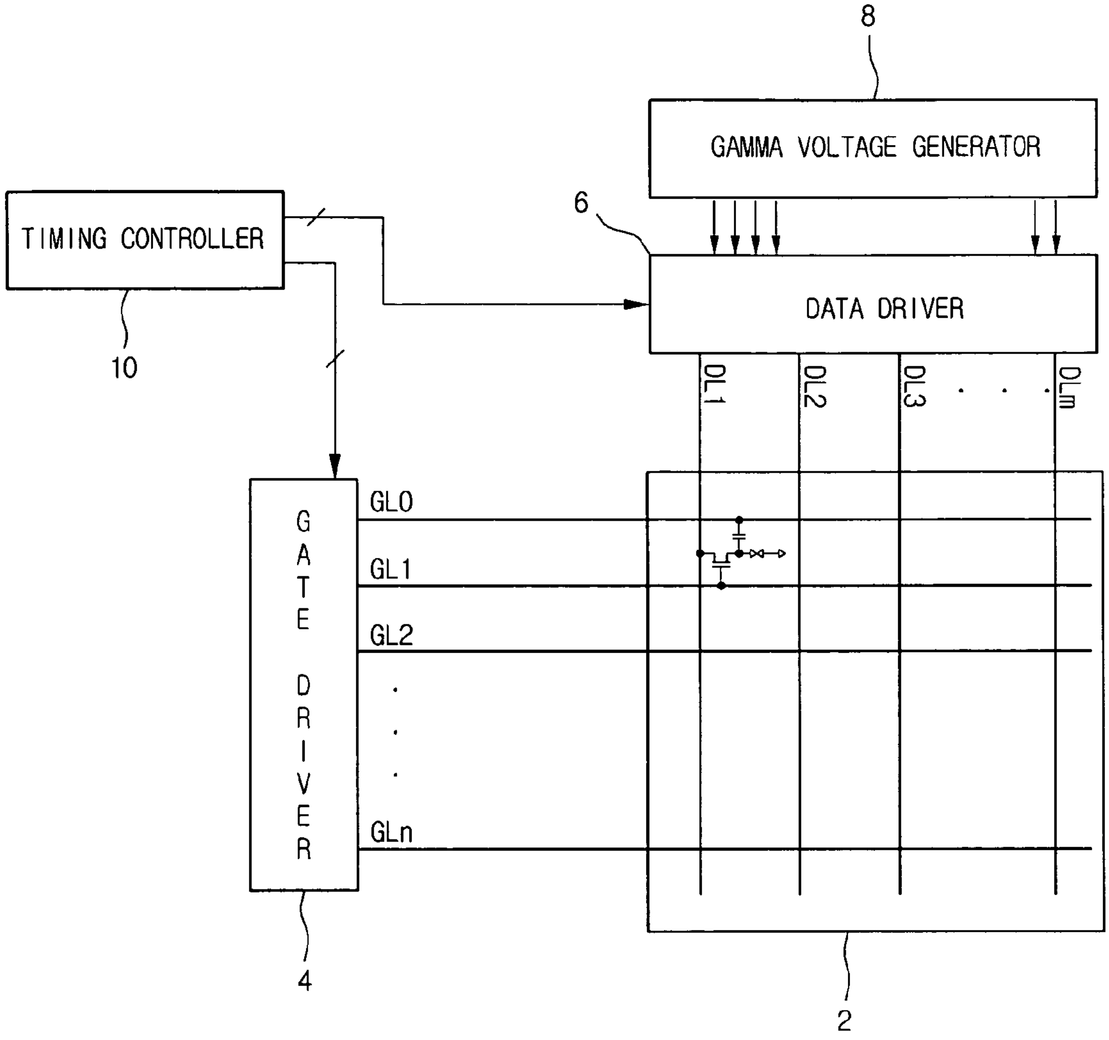
Fig.1 Related Art
FIG. 1 is a schematic view of a related art LCD.
Figure 2:
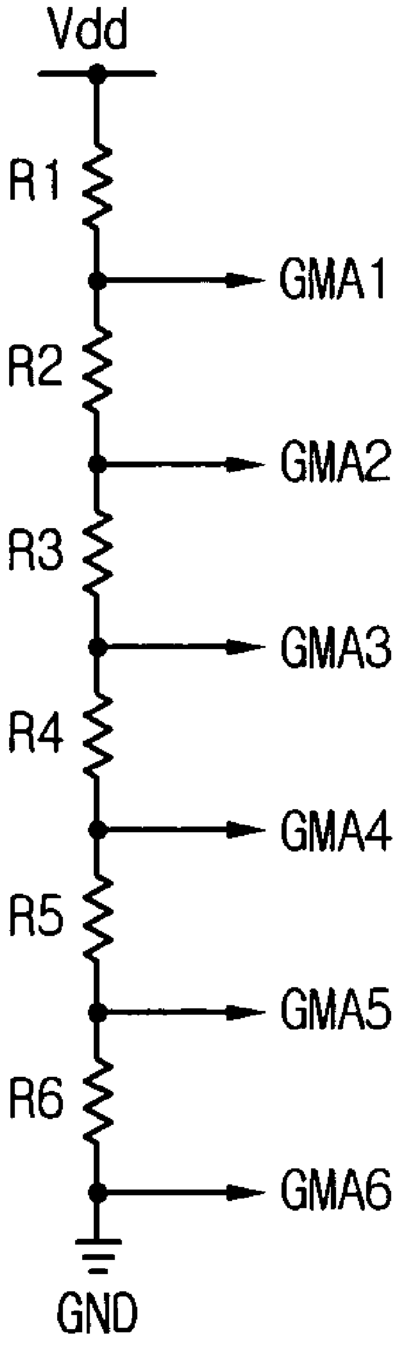
Fig.2 Related Art
FIG. 2 is a circuit diagram of a gamma voltage generator of FIG. 1.
Figure 3:
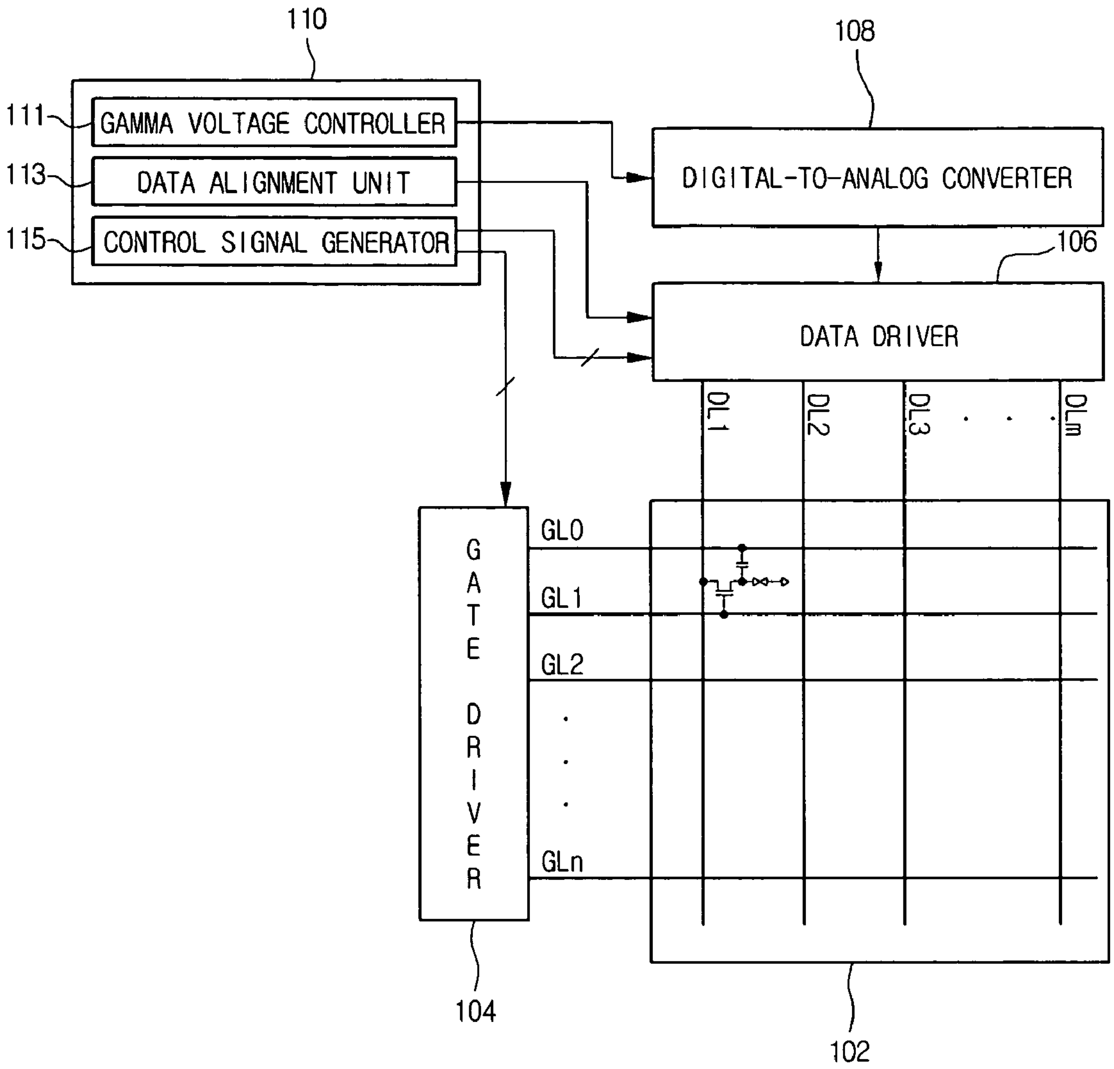
FIG. 3 is a schematic view of an LCD according to an exemplary embodiment of the present invention.

FIG. 3 is a schematic view of an LCD according to an exemplary embodiment of the present invention. As shown in FIG. 3, a liquid crystal display device (LCD) includes a timing controller 110, a gate driver 104, a digital-to-analog (D/A) converter 108, a data driver 106, and a liquid crystal panel 102.

The timing controller 110 supplies a data signal, generates predetermined gate and data control signals, and a digital gamma signal. The gate driver 104 supplies a scan signal in response to the gate control signal. The D/A converter 108 converts the digital gamma signal to an analog gamma voltage. The data driver 106 generates an analog data signal corresponding to the data signal using the analog gamma voltage. Accordingly, the liquid crystal panel 102 displays an image according to the analog data signal in response to the scan signal.

A plurality of gate lines GL0 to GLn and a plurality of data lines DL1 to DLm are arranged on the liquid crystal panel 102. Thin film transistors (TFTs) are formed at intersections of the gate lines GL0 to GLn and data lines DL1 to DLm. The TFTs are electrically connected to the gate lines GL0 to GLn such that the TFTs are switched on/off by the scan signals.

The gate driver 104 supplies the scan signals to the gate lines GL1 to GLn in response to the gate control signals generated from the timing controller 110, and controls the on/off operation of the TFTs. The data driver 106 supplies the analog data signals to the data lines DL1 to DLm according to data control signals generated from the timing controller 110. The analog data signals are supplied to pixel electrodes through the TFTs when the TFTs are switched on.

The timing controller 110 includes a data alignment unit 113, a control signal generator 115, and a gamma voltage controller 111. The data alignment unit 113 arranges red (R), green (G), and blue (B) data signals supplied from a display system (not shown). The control signal generator 115 generates the gate control signals and data control signals using a vertical sync signal (Vsync) and a horizontal sync signal (Hsync) supplied from the system and a dot clock signal DCLK. The gamma voltage controller 111 generates a digital gamma signal using the dot clock signal DCLK and controls an analog gamma voltage using the digital gamma signal.

Figure 4:
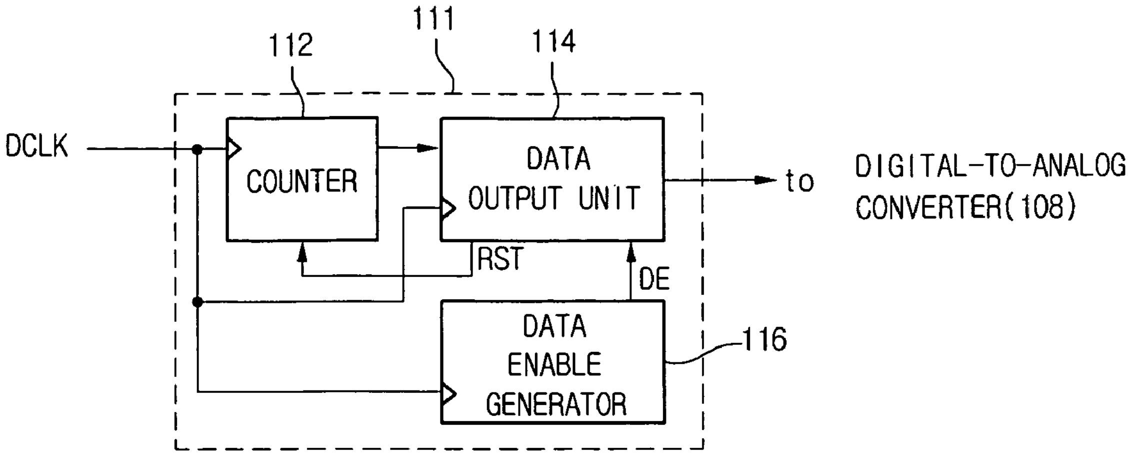
FIG. 4 is a plan view of an exemplary gamma voltage controller of FIG. 3.

As illustrated in FIG. 4, the gamma voltage controller 111 includes a counter 112, a data output unit 114, and a data enable generator 116. The counter 112 counts the dot clock signals DCLK during a predetermined interval. The data output unit 114 outputs a digital gamma signal with a number of bits (e.g. 16 bits) counted in the counter 112. The data enable generator 116 generates a data enable signal DE with a predetermined interval.

The dot clock signal DCLK is generated with a repeating cycle having a high level and a low level. The data enable generator 116 generates the data enable signal DE with a predetermined interval using the dot clock signal DCLK. For example, the predetermined interval may be 16 clock cycles. One clock cycle includes a high level and a low level of the dot clock signal DCLK. However, the predetermined interval may be set or modified without departing from the scope of the present invention. In this example, the data enable signal DE is at a low level during a first interval of the first 16 clock cycles and at a high level during a second interval with the next 16 clock cycles. Accordingly, the data enable signal DE has a low level and a high level generated alternately and repeatedly within the predetermined interval (e.g., 16 clock cycles).

The data output unit 114 outputs a digital gamma signal corresponding to the data enable signal DE with the predetermined interval output from the data enable generator 116. As an example, the digital gamma signal may have 16 clock cycles during the predetermined interval and 16 bits. As illustrated in FIG. 6, two bits (C0 and C1) may be designated as control signals, four bits (A0, A1, A2, and A3) may be designated as channel address signals, and ten bits may be designated as gamma data signals. The control signals and the channel address signals may be allocated and set in advance. However, the gamma signals may be generated randomly.

The control signals are optional to control the gamma correction and timing controller 110. The channel address signal is an address signal for controlling an output channel of the D/A converter 108 and may be set in advance. For example, assuming that the output channels of the D/A converter 108 are A, B, C, and D, output channel A is selected when A0|A1|A2 is 000, output channel B is selected when A0|A1|A2 is 100, output channel C is selected when A0|A1|A2 is 110, and output channel D is selected when A0|A1|A2 is 111.

As illustrated in FIG. 6, when a channel address signal A0|A1|A2 is 100 and a gamma data signal D0|D1|D2|D3|D4|D5|D6|D7|D8|D9 is 1111111111, the gamma data signal (i.e., 1111111111) supplied to the D/A converter 108 causes an analog gamma signal having a value of '1023' to be output to the output channel B of the D/A converter 108.

The digital gamma signal is a count value of the counter 112 output by the data output unit 114 during the predetermined interval defined by the data enable generator 116. The data output unit 114 supplies a reset signal RST to the counter 112 when the predetermined interval is finished.

The counter 112 supplies a count value to the data output unit 114 by counting a high level or a low level at each clock cycle. The count 112 is reset by the reset signal RST supplied from the data output unit 114 and then initialized.

A digital gamma signal is output from the data output unit 114 according to the count value provided by the counter 112 during the predetermined interval (e.g., 16 clock cycles). That is, the digital gamma signal corresponding to each count value is output until the count value is changed from 0 to 16. In this case, there are 16 count values during the predetermined interval (i.e., 16 clock cycles). Accordingly, the reset signal RST is generated by the data output unit 114 and is supplied to the counter 112 when all 16 count values of the digital gamma signals are output during the predetermined interval. The counter 112 is then reset by the reset signal RST, and thus the counter 112 restarts the count value.

Figure 5:
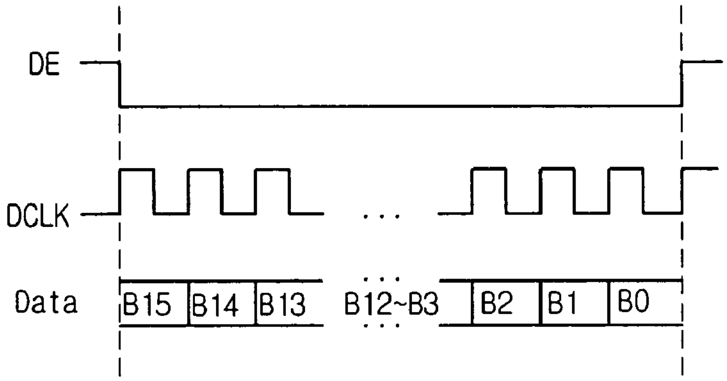
FIG. 5 is a wave form diagram illustrating signals of the gamma voltage controller of FIG. 4.

FIG. 5 is a waveform diagram illustrating signals of the exemplary gamma voltage controller of FIG. 4. As illustrated in FIGS. 4 and 5, an inversed signal of the data enable signal DE is supplied, and the dot clock signal DCLK is output in a predetermined order during a low level interval of the inversed data enable signal DE. The digital gamma signal is output in correspondence to a high level interval of the dot clock signal DCLK.

FIG. 6 is a table illustrating exemplary digital gamma signals output from the data output unit 114 of FIG. 4. In the exemplary embodiment illustrated in FIGS. 4 and 6, the digital gamma signal includes 16 bits. Two bits C0 and C1 represent control signals, four bits A0 to A3 represent signals that designate an output channel of the D/A converter 108. Additionally, ten bits D0 to D9 represent the digital gamma signals. A voltage level of a gamma voltage output from the D/A converter 108 is determined by the 10 bits D0 to D9. The 16-bit digital gamma signal is supplied to the D/A converter 108. It is to be understood that different number of bits may be used without departing from the scope of the present invention.

For purposes of illustration only, the D/A converter 108 is designated to have 4 output channels with a maximum output gamma voltage of 10 V and a minimum output gamma voltage of 0 V. Additionally, a minimum and a maximum value of the digital gamma signal output from the data output unit 114 are 0 and 1023, respectively.

When the control signals C0 and C1=0, signals A0 to A2=0, and the digital gamma signals D0 to D9=0, the D/A converter 108 outputs an analog gamma voltage corresponding to the value of 0 to output channel A. When the control signals C0 and C1=0, signal A0=1, signals A1 and A2=0, and the digital gamma signals D0 to D9=1, the D/A converter 108 outputs an analog gamma voltage corresponding to a value of 1023 to output channel B. In this way, the output channel of the D/A converter 108 and an analog gamma voltage are determined by the digital gamma signal. Accordingly, the D/A converter 108 supplies the corresponding analog gamma voltage to the data driver 106.

The data driver 106 supplies the analog gamma voltage output from the D/A converter 108 to a resistance-string unit (not shown). The analog gamma voltage is derived into a preferred gray scale level (e.g. 256 gray scale levels) by the resistance-string unit. Accordingly, the data driver 106 outputs an analog data signal by selecting a gray scale level corresponding to the digital data signal. The LCD converts the digital gamma signal supplied in a digital mode into an analog gamma voltage and supplies the analog gamma voltage to the data driver 106. Therefore, the gamma voltage can be controlled easily and accurately.

Figure 7:
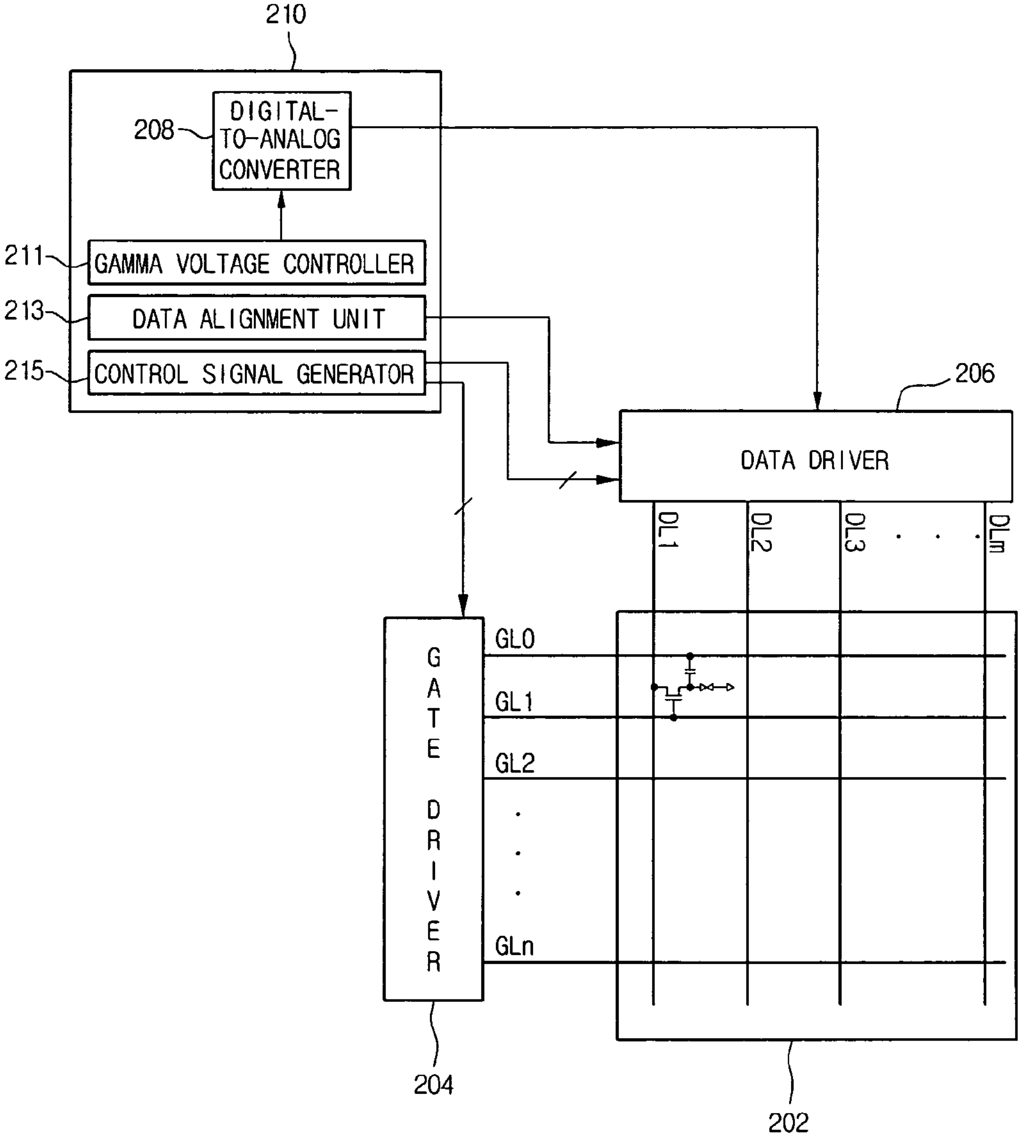
FIG. 7 is a schematic view of an LCD according to another exemplary embodiment of the present invention.

FIG. 7 is a schematic view of an LCD according to another exemplary embodiment of the present invention. In particular, unlike the LCD of FIG. 3 in which the D/A converter 108 is separated from the timing controller 110, an exemplary LCD of FIG. 7 includes a D/A converter 208 inside a timing controller 210, thereby simplifying the circuit configuration. To this end, FIG. 7 illustrates an LCD including a timing controller 210, a gate driver 204, a data driver 206, and a liquid crystal panel 202.

The timing controller 210 supplies data signals, generates predetermined gate and data control signals, and digital gamma signals. The gate driver 204 supplies a scan signal in response to the gate control signal. The data driver 206 generates analog data signals corresponding to the data signals using the analog gamma voltage. The liquid crystal panel 202 displays an image according to the analog data signals in response to the scan signal.

More specifically, the timing controller 210 includes a control signal generator 215, a data alignment unit 213, a gamma voltage controller 211, and a D/A converter 208. The control signal generator 215 and the data alignment unit 213 function similar as described above for the first exemplary embodiment of the present invention, and therefore further descriptions of these units will be omitted for the sake of convenience.

The gamma voltage controller 211 generates a digital gamma signal using a dot clock signal DCLK and functions in a similar manner as described above with reference to FIG. 4. For instance, the gamma voltage controller 211 may generate a digital gamma signal of 16 bits in synchronization with the dot clock signal DCLK and supply the digital gamma signal to the D/A converter 208. The D/A converter 208 selects an output channel by analyzing the 16-bit digital gamma signal, converts the digital gamma signal into an analog gamma voltage, and then supplies the analog gamma voltage to the data driver 206.

The data driver 206 supplies the analog gamma voltage output from the D/A converter 208 to a resistance-string unit (not shown). The analog gamma voltage is derived into a preferred gray sale level (e.g. 256 gray scale levels) by the resistance-string unit. Accordingly, the data driver 206 outputs an analog data signal by selecting a gray scale level corresponding to the digital data signal. Because the LCD of this exemplary embodiment includes a gamma voltage controller and a D/A converter formed together inside the timing controller, the driving circuit can be simplified.

As described above, the gamma voltage can be controlled easily and accurately by controlling the analog gamma voltage using the digital gamma signal. Furthermore, since the digital gamma controller and the digital-to-analog converter are mounted together inside the timing controller, the driving circuit can be simplified and a sufficient margin of a data printed circuit board (PCB) can be obtained. Therefore, space utilization can also be maximized.

It will be apparent to those skilled in the art that various modifications and variations can be made in the gamma correction device and gamma correction method thereof of the present invention and LCD using the same without departing form the spirit or scope of the invention. Thus, it is intended that the present invention cover the modifications and variations of this invention provided they come within the scope of the appended claims and their equivalents.

What is claimed is:

1. A gamma correction device for use in a display device, comprising:

a gamma voltage controller to generate a digital gamma signal in a unit of a predetermined interval; and a gamma voltage generator to generate an analog gamma voltage corresponding to the digital gamma signal, wherein the gamma voltage controller includes a counter to count clock signals during the predetermined interval and output a count value, a data enable generator to generate a data enable signal during the predetermined interval based on the clock signal and a data output unit to output the digital gamma signal corresponding to the count value in response to the data enable signal, wherein the clock signal has one clock cycle of a high level and a low level, and the counter performs the counting operation using one of the high level and the low level, wherein the data enable signal is maintained at one of a high level and a low level during the predetermined interval.

2. The gamma correction device according to claim 1, wherein the data enable signal changes from a low level to the high level or from high level to a low level in the unit of the predetermined interval.

3. The gamma correction device according to claim 1, wherein the data output unit generates a reset signal at the end of the predetermined interval, and the counter is reset by the reset signal.

4. The gamma correction device according to claim 1, wherein the digital gamma signal includes a control signal, a channel address signal, and a gamma data signal, wherein the control signal and the channel address signal are set by a user of the display device.

5. The gamma correction device according to claim 4, wherein the gamma data signal is generated randomly.

6. A liquid crystal display device (LCD), comprising:

a timing controller including a gamma voltage controller to generate a digital gamma signal in a unit of a predetermined interval;

a digital-to-analog converter to generate an analog gamma voltage corresponding to the digital gamma signal; and a liquid crystal panel to display an image according to the analog gamma voltage, wherein the gamma voltage controller includes a counter to count clock signals during the predetermined interval and output a count value, a data enable generator to generate a data enable signal during the predetermined interval based on the clock signal and a data output unit to output the digital gamma signal corresponding to the count value in response to the data enable signal, wherein the data enable signal changes from a low level to a high level or from a high level to a low level in the unit of the predetermined interval, wherein the data output unit generates a reset signal at the end of the predetermined interval, and the counter is reset by the reset signal.

7. The LCD according to claim 6, wherein the digital gamma signal includes a control signal, a channel address signal, and a gamma data signal.

8. The LCD according to claim 7, wherein the gamma data signal is generated randomly.

9. A liquid crystal display device (LCD), comprising:

a timing controller including a gamma voltage controller to generate a digital gamma signal in a unit of a predetermined interval and a digital-to-analog converter to generate an analog gamma voltage corresponding to the digital gamma signal; and a liquid crystal panel for displaying an image according to the analog gamma voltage, wherein the gamma voltage controller includes a counter to count clock signals during the predetermined interval and output a count value, a data enable generator to generate a data enable signal during the predetermined interval based on the clock signal and a data output unit to output a digital gamma signal corresponding to the count value in response to the data enable signal, wherein the data enable signal changes from a low level to a high level or from a high level to a low level in the unit of the predetermined interval, wherein the data output unit generates a reset signal at the end of the predetermined interval, and the counter is reset by the reset signal.

10. The LCD according to claim 9, wherein the digital gamma signal includes a control signal, a channel address signal, and a gamma data signal.

11. The LCD according to claim 10, wherein the gamma data signal is generated randomly.

12. A gamma correction method, comprising:

generating a digital gamma signal in a unit of a predetermined interval; and generating an analog gamma voltage corresponding to the digital gamma signal, wherein the generating of the digital gamma signal includes counting clock signals during the predetermined interval and outputting a count value, generating a data enable signal during the predetermined interval based on the clock signal and outputting a digital gamma signal corresponding to the count value in response to the data enable signal, wherein the digital gamma signal includes a control signal, a channel address signal, and a gamma data signal.

* * * * *